United States Patent [19]

Masumoto et al.

[11] Patent Number: 5,021,541

[45] Date of Patent: Jun. 4, 1991

[54] POLYCARBONATE RESIN FROM BIS(HYDROXY BENZOYL OXY-TETRA OXA SPIRO) CPD.

[75] Inventors: Mitsuhiko Masumoto; Satoshi Kanayama; Toshiaki Asoh; Teruo Kawahigashi, all of Osaka, Japan

[73] Assignee: Mitsubishi Gas Chemical Co., Ltd., Tokyo, Japan

[21] Appl. No.: 480,461

[22] Filed: Feb. 15, 1990

[30] Foreign Application Priority Data

Feb. 15, 1989 [JP] Japan ................................ 1-33835

[51] Int. Cl.$^5$ ............................................. C08G 64/04
[52] U.S. Cl. ................................ 528/196; 528/125; 528/171; 528/174; 528/176; 528/179; 528/182; 528/191; 528/193; 528/199; 528/202; 528/204; 528/206
[58] Field of Search ............... 528/196, 202, 204, 171, 528/174, 125, 176, 179, 182, 191, 193, 199, 206

[56] References Cited

U.S. PATENT DOCUMENTS 4,736,016  4/1988  Brunelle et al. ................... 528/196

*Primary Examiner*—Harold D. Anderson
*Attorney, Agent, or Firm*—Sughure, Mion, Zinn, Macpeak & Seas

[57] ABSTRACT

A polycarbonate resin comprising either a structural unit derived from a spiro ring-containing dihydric phenol, or such a structural unit and a structural unit derived from a dihydric phenol, and a process for producing the same. The polycarbonate resin has excellent flowability and moldability, and also improved optical properties (low refractive index, large Abbe number, etc.), and can be advantageously used in various fields, e.g., as a material for molded articles for optical use and other precision molded articles.

17 Claims, No Drawings

POLYCARBONATE RESIN FROM BIS(HYDROXY BENZOYL OXY-TETRA OXA SPIRO) CPD.

FIELD OF THE INVENTION

The present invention relates to a novel polycarbonate resin having excellent flowability, optical properties, and heat resistance, and to a process for producing the polycarbonate resin. Specifically, this invention relates to a polycarbonate resin comprising a structural unit derived from a spiro ring-containing dihydric phenol represented by the following formula, and also to a process for producing such polycarbonate resin.

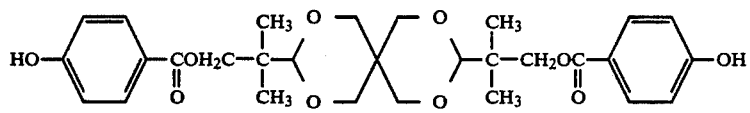

Due to its excellent properties, the polycarbonate resin according to the present invention can be advantageously used as a material for molded articles for optical use and other precision molded articles, a general-purpose molding material, and a film or sheet material, and also in other various fields.

BACKGROUND OF THE INVENTION

Polycarbonate resins have conventionally been known as materials having excellent heat resistance, transparency, mechanical strength, electrical properties, non-toxicity, and other properties. However, they have a drawback of poor flowability.

Various methods have so far been proposed to improve the poor flowability. For example, there is a method of adding a plasticizer to a polycarbonate resin as disclosed in, for example, JP-B-45-39941 and JP-B-48-4100, and a method of using a fatty acid having an aliphatic, long-chain alkyl group, a chloride of such fatty acid, a (long-chain-alkyl)phenol, or the like, which has a plasticizing effect, as a molecular weight modifier or a terminator as disclosed in, for example, JP-B-52-50078. (The term "JP-B" as used herein means an "examined Japanese patent publication".) Of those, the method of using a plasticizer is disadvantageous, although the flowability of the polycarbonate resin is improved, in that plasticizer vapor having a peculiar offensive odor is evolved during molding, and not only does this vapor condense and adhere to mold surfaces and is then transferred to the surfaces of the molded articles produced, thus causing the molded articles to have poor appearances, but also the plasticizer vapor worsens the working atmosphere due to its offensive odor and causes various other problems. The method of introducing a long-chain alkyl group into the terminals of polycarbonate molecules is disadvantageous in that a considerable improvement of flowability cannot be expected because the amount of long-chain alkyl groups which can be introduced into molecular terminals is limited, although this method is free from offensive odors and other problems caused by plasticizers and the flowability is improved to some extent.

Further, polycarbonate resins have conventionally been utilized as an optical material, and known methods for improving the refractive index thereof include a method of introducing a phenyl group, sulfur, a halogen, or the like into the polycarbonate resin structure. However, polycarbonate resins having such a group or element introduced into their structures show poor flowability and, hence, are poor in moldability. In addition, since the refractive indexes of the thus-improved polycarbonate resins are limited to a certain value, it has been difficult to obtain a polycarbonate resin having a low refractive index and a large Abbe number suitable for various purposes of use.

SUMMARY OF THE INVENTION

As a result of intensive studies to overcome the above-described problems accompanying the conventional polycarbonate resins, it has been found that a polycarbonate resin having improved flowability and optical properties and very small deterioration in heat resistance can be obtained by using a spiro ring-containing dihydric phenol as all or part of the dihydric phenol compound(s). The present invention has been completed based on this finding.

Accordingly, an object of the present invention is to provide a polycarbonate resin which shows excellent flowability and moldability and has improved optical properties, i.e., a low refractive index and large Abbe number suitable for various purposes of use, which is different from the above-described conventional polycarbonate resins.

Another object of the present invention is to provide a process for producing the above polycarbonate resin.

The polycarbonate resin of the present invention comprises a structural unit represented by the following structural formula A;

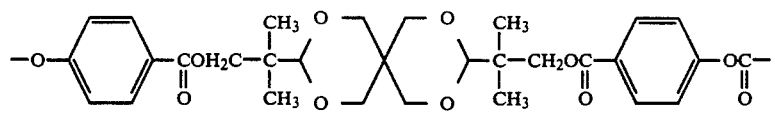

The polycarbonate resin of the present invention also comprises the structural unit represented by the structural formula A described above and a structural unit represented by the following structural formula B;

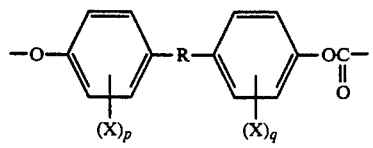

wherein R is a divalent aliphatic group, an alicyclic group, a phenyl-substituted alkylidene group, —O—, —S—, —SO—, —SO$_2$—, or —CO—, X is a halogen atom or a lower alkyl group, and p and q each is 0 or an integer of 1 or 2.

The process for producing the above-described polycarbonate resin according to the present invention comprises reacting a dihydric phenol compound with phosgene, a carbonic acid diester, or a polycarbonate precursor by a solution method, wherein the dihydric phenol compound is either a spiro ring-containing dihydric phenol represented by the following formula (1), or the spiro ring-containing dihydric phenol represented by the formula (1) and a dihydric phenol represented by the following formula (2);

Formula (1):

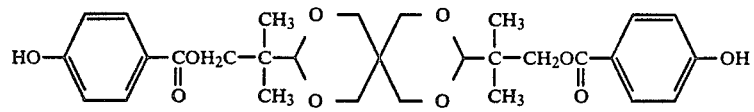

Formula (2):

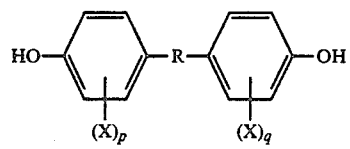

wherein R, X, p, and q are the same as defined above.

In a preferred embodiment of the process for producing the polycarbonate resin according to the present invention, the spiro ring-containing dihydric phenol represented by the above formula (1) is used in an amount of from 5 to 100 mol% per mole of the total dihydric phenols used.

DETAILED DESCRIPTION OF THE INVENTION

In R of the structural formula B, the dihydric aliphatic group preferably has 1 to 8 carbon atoms, the alicyclic group is preferably a cyclohexyl group, and the phenylsubstituted alkylidene group preferably has 8 to 15 carbon atoms. Further, in X, the halogen atom is preferably chlorine or bromine, and the lower alkyl group preferably has 1 to 4 carbon atoms.

The polycarbonate resin of the present invention comprises a structural unit derived from the spiro ring-containing dihydric phenol represented by the above formula (1). This spiro ring-containing dihydric phenol can generally be obtained by the method disclosed in, for example, U.S. patent application Ser. No. 07/355,722, filed May 19, 1989. This is, an alkyl p-hydroxybenzoate and the spiro glycol represented by the formula

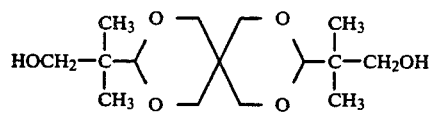

are subjected to a transesterification reaction in the presence of a transesterification catalyst comprising an organotin compound and/or inorganic tin compound, thereby yielding the dihydric phenol.

The polycarbonate resin of this invention is a polycarbonate resin obtained from the spiro ring-containing dihydric phenol represented by the formula (1) above and a copolycarbonate resin obtained from the spiro ring-containing dihydric phenol represented by the formula (1) and a dihydric phenol represented by the formula (2) above.

Examples of the dihydric phenol of the formula (2) which is copolymerized with the spiro ring-containing dihydric phenol of the formula (1) to produce the copolycarbonate resin include bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl) propane, 2,2-bis(4-hydroxy-3-bromophenyl)propane, 2,2-bis(4-hydroxy-3-chlorophenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane. Of those, 2,2-bis(4-hydroxyphenyl)propane and 1,1-bis(4-hydroxyphenyl)cyclohexane are particularly preferred from the standpoint of the thermal stability of the copolycarbonate resin produced.

The process for producing the polycarbonate resin according to the present invention is the same production process as the conventionally known solution method, such as an interfacial polymerization method or a pyridine method, except that the spiro ring-containing dihydric phenol represented by the formula (1) above is used as all or part of the dihydric phenol(s).

That is, the polycarbonate resin of the present invention can be obtained by reacting either the spiro ring-containing dihydric phenol of the formula (1), or the spiro ring-containing dihydric phenol of the formula (1) and the dihydric phenol of the formula (2), with phosgene, a carbonic acid diester, or a polycarbonate precursor in a solvent.

Illustratively stated, in the interfacial polymerization method, the dihydric phenols respectively represented by the formulas (1) and (2) above and a molecular weight modifier are reacted with phosgene in the presence of an inert organic solvent and an aqueous alkali solution. After completion of the reaction, a tertiary amine or a quaternary ammonium salt is added as a polymerization catalyst to the resulting reaction system to conduct interfacial polymerization, thereby obtaining a polycarbonate resin. In the case of the pyridine method, the dihydric phenols respectively represented by the formulas (1) and (2) above and a molecular weight modifier are dissolved in pyridine or in a mixed solution of pyridine and an inert solvent, and phosgene is then introduced into the resulting solution, thereby directly obtaining a polycarbonate resin. Although the dihydric phenols respectively represented by the formulas (1) and (2) are reacted simultaneously in the above-described methods, the phenols may be reacted in other manners. That is, the following methods may be employed: in which the dihydric phenol of the formula (2) is first reacted with phosgene and the dihydric phenol of the formula (1) is then reacted therewith, or a method in which the dihydric phenol of the formula (1) is first reacted with phosgene and the dihydric phenol of general formula (2) is then reacted therewith.

Examples of the inert solvent which can be used for the polymerization reaction include chlorinated hydrocarbons such as dichloromethane, 1,2-dichloroethane, 1,1,2,2 tetrachloroethane, chloroform, 1,1,1-trichloroethane, carbon tetrachloride, monochlorobenzene, and dichlorobenzene; aromatic hydrocarbons such as benzene, toluene, xylene, and ethylbenzene; and ethers such as diethyl ether. Those organic solvents may be used alone on in combination of two or more thereof. If desired and necessary, the above-described water-immiscible solvents may be used in the form of a mixture with a hydrophilic solvent such as an ether other than the above-described ethers, a ketone, an ester, or a nitrile. In this case, the hydrophilic solvent is used in the proportion to an extent such that the mixed solvent system is not completely compatible with water.

The molecular weight modifier used in this invention is a conventionally known monovalent aromatic hydroxy compound, and the examples thereof are m- and p-methylphenols, m- and p-propylphenols, p-bromophenol, tribromophenols, p-tert-butylphenol, phenol substituted with a long-chain alkyl group, and long-chain alkyl acid chlorides.

The polymerization catalyst used in this invention is a conventional tertiary amine or quaternary ammonium salt. Examples of the tertiary amines are trimethylamine, triethylamine, tributylamine, tripropylamine, trihexylamine, tridecylamine, N,N-dimethylhexylamine, pyridine, quinoline, and dimethylaniline, and examples of the quaternary ammonium salts are trimethylbenzylammonium chloride, tetramethylammonium chloride, and triethylbenzylammonium chloride.

According to the present invention, a polyfunctional organic compound having a phenolic hydroxyl group may be added as a branching agent to the above-described dihydric phenols to produce a branched polycarbonate resin.

Examples of such a polyfunctional organic compound include polyhydroxy compounds such as phloroglycine, 2,6-dimethyl-2,4,6-tri(4-hydroxyphenyl)heptene-3, 4,6-dimethyl-2,4,6-tri(4-hydroxyphenyl)heptene-2,1,3,5-tri(2-hydroxyphenyl)benzole 1 1 1-tri(4-hydroxyphenyl)ethane, 2,6-bis(2-hydroxy-5methylbenzyl)-4-methylphenol, and α,α',α"-tri(4-hydroxyphenyl)1,3,5-triisopropylbenzene; 3,3-bis(4-hydroxyaryl)oxindol (=isatin bisphenol); 5-chloroisatin, 5,7-dichloroisatin, and 5-bromoisatin. The phenolic hydroxyl group-containing polyfunctional organic compound having at least three functional groups as a branching agent is used in an amount of from 0.01 to 3 mol%, preferably from 0.1 to 1.0 mol%, per mole of the total dihydric phenols represented by the formulas (1) and (2).

The flowability during molding of this polycarbonate resin obtained by the process of this invention and the optical properties of molded articles obtained from the polycarbonate resin are mainly determined by the molecular weight of the polycarbonate resin obtained and the proportions of the dihydric phenols of the formulas (1) and (2) used. In other words, a polycarbonate resin having desired flowability and optical properties can be obtained by suitably selecting and combining the amount of the molecular weight modifier added and the amount of the dihydric phenol of the formula (1) used.

In the present invention, in the case of the polycarbonate resin comprising the structural unit derived from the dihydric phenol of the formula (1) and the structural unit derived from the dihydric phenol of the formula (2), the amount of the dihydric phenol of the formula (1) used is at least 5 mol% per mole of the total dihydric phenols used.

In particular, from the standpoint of producing a polycarbonate resin having good heat resistance and improved flowability and optical properties, the amount of the dihydric phenol of the formula (2) used is preferably at least 10 mol%, and more preferably from 10 to 95 mol%. The molecular weight of the polycarbonate resin obtained by the process according to the invention is generally from 0.3 to 2.0, preferably from 0.4 to 1.0, in terms of intrinsic viscosity $\eta$ as measured at 25° C. in methylene chloride, from the standpoints of mechanical strength and flowability.

In comparison with conventional polycarbonate resins, the polycarbonate resin of the present invention has a low melt viscosity and greatly improved flowability, and also shows excellent optical properties. Due to those excellent properties, the polycarbonate resin of the present invention not only can be easily processed even by molding methods that have been regarded as being difficult with conventional polycarbonate resins, but enables ordinary molding to be conducted at lower molding temperatures, thereby significantly suppressing thermal decomposition of the resin during molding. Therefore, the polycarbonate resin of the present invention is suitable for use as a precision molding material or the like. Furthermore, since the polycarbonate resin of the present invention gives molded or formed articles having excellent optical properties, the resin can be used in optical fields such as lenses and is also useful as a material for a film, sheet, and other uses.

The present invention will be explained in more detail by reference to the following Examples, Comparative Examples, and Reference Example, but the Examples should not be construed to be limiting the scope of the invention.

REFERENCE EXAMPLE

Synthesis of the spiro ring-containing dihydric phenol represented by general formula (1)

Into a reactor equipped with a stirrer, nitrogen-introducing pipe, thermometer, separator, and condenser were introduced 9.1 kg (30 mols) of 3,9-bis(1,1-dimethyl-2-hydroxyethyl)-2,4,8,10-tetraoxaspiro [5.5]undecane, 10 kg (66 mols) of methyl 4-hydroxybenzoate, 149 g (0.6 mols) of dibutyltin oxide, and 1.5 liters of xylene. The resulting mixture was heated to 200° C. while distilling off the xylene, and then kept with stirring at that temperature for 18 hours. After cooling the reaction mixture to room temperature, 17 kg of a pale yellow semi-crystalline product was obtained. This product was recrystallized from methyl ethyl ketone, thereby obtaining 10.6 kg of white crystals having a melting point of 236°-239° C. (yield: 65%). These crystals were identified as the desired compound by elementary analysis and IR spectral analysis.

|  | C | H |
|---|---|---|
| Elementary Analysis: | | |
| Calcd.: | 63.96% | 6.66% |
| Found: | 64.19% | 6.79% |
| IR Spectral Analysis: | | |
| $\nu^{max}$ (KBr): 3285, 1680 cm$^{-1}$ | | |

EXAMPLE 1

In 48 liters of water was dissolved 1.4 kg of sodium hydroxide. While keeping the resulting solution at 20° C., 4.4 kg of 3,9-bis[1,1-dimethyl-2-(4,-hydroxybenzoyloxy)ethyl]2,4,8,10-tetraoxaspiro[5.5]-undecane (hereinafter referred to as "SGOB") and 8 g of hydrosulfite were dissolved therein. To the resulting solution was added 32 liters of methylene chloride. While stirring the resulting mixture, 60.6 g of p-tert-butylphenol (hereinafter referred to as "TBP") was added therto as a molecular weight modifier, and 1.05 kg of phosgene was blown therethrough over a period of 60 minutes.

After completion of the blowing of phosgene, the liquid reaction mixture was emulsified by vigorous stirring. 8 g of triethylamine was then added to the emulsified reaction mixture and polymerization was conducted for about 1 hour with continuous stirring.

The resulting liquid polymerization mixture was separated into an aqueous phase and an organic phase. The organic phase was neutralized with phosphoric acid, and then washed with water repeatedly until the pH of the washings became neutral. From the resulting organic phase, a polymerization product was precipitated by adding thereto 35 liters of isopropanol. The precipitate was filtered off and dried to obtain a polycarbonate resin in a white powder form.

The polycarbonate resin obtained above was extruded into pellets at 220° to 240° C. with a 40 mm vented extruder. Using the pellets, the viscosity, flow value, and optical properties of the polycarbonate resin were evaluated. The results obtained are shown in the Table below.

EXAMPLE 2

In 45 liters of water was dissolved 3.8 kg of sodium hydroxide. While keeping the resulting solution at 20° C., 4.4 kg of 2,2-bis(4-hydroxyphenyl)propane (hereinafter referred to as "BPA"), 7.0 kg of SGOB, and 8 g of hydrosulfite were dissolved therein. To the resulting solution was added 32 liters of methylene chloride. While stirring the resulting mixture, 168 g of TBP was added thereto as a molecular weight modifier and 3.8 kg of phosgene was blown therethrough over a period of 60 minutes.

After completion of the blowing of phosgene, the liquid reaction mixture was emulsified by vigorous stirring. 8 g of triethylamine was then added to the emulsified reaction mixture and polymerization was conducted for about 1 hour with continuous stirring.

The resulting liquid polymerization mixture was separated into an aqueous phase and an organic phase. The organic phase was neutralized with phosphoric acid, and then washed with water repeatedly until the pH of the washings became neutral. From the resulting organic phase, a polymerization product was precipitated by adding thereto 35 liters of isopropanol. The precipitate was filtered off and dried to obtain a polycarbonate resin in a white powder form.

The polycarbonate resin obtained above was extruded into pellets at 240° to 260° C. with a 40 mm vented extruder. Using the pellets, the viscosity, flow value, and optical properties of the polycarbonate resin were evaluated. The results obtained are shown in the Table below.

EXAMPLE 3

A polycarbonate resin was obtained in the same manner as in Example 2 except that 6.6 kg of BPA, 1.7 kg of SGOB, and 145 g of TBP were used as raw materials. The polycarbonate resin thus obtained was pelletized and evaluated for viscosity, flow value, and optical properties in the same manner as in Example 2 except that the temperature in the extruder was 260°-280° C. The results obtained are shown in the Table below.

EXAMPLE 4

The same procedures as in Example 2 were repeated except that 4.3 kg of 1,1-bis(4-hydroxyphenyl)cyclohexane (hereinafter referred to as "BPZ") was used in place of 4.4 kg of BPA, and the amounts of SGOB and TBP were changed to 8.7 kg and 216 g, respectively.

The viscosity, flow value, and optical properties of the polycarbonate resin obtained are shown in the Table below.

EXAMPLE 5

The same procedures as in Example 2 were repeated except that 3.4 kg of BPZ was used in place of 4.4 kg of BPA, an the amounts of SGOB and TBP were changed to 10.4 kg and 230 g, respectively.

The viscosity, flow value, and optical properties of the polycarbonate resin obtained are shown in the Table below.

COMPARATIVE EXAMPLE 1

In 42 liters of water was dissolved 3.7 kg of sodium hydroxide. While keeping the resulting solution at 20° C., 7.3 kg of BPA and 8 g of hydrosulfite were dissolved therein.

To the resulting solution was added 28 liters of methylene chloride. While stirring the resulting mixture, 135 g of TBP was added thereto and 3.5 kg of phosgene was blown therethrough over a period of 60 minutes.

After completion of the blowing of phosgene, the liquid reaction mixture was emulsified by vigorous stirring. 8 g of triethylamine was then added to the emulsified reaction mixture and polymerization was conducted for about 1 hour with continuous stirring.

The resulting liquid polymerization mixture was separated into an aqueous phase and an organic phase. The organic phase was neutralized with phosphoric acid, and then washed with water repeatedly until the pH of the washings became neutral. From the resulting organic phase, a polymerization product was precipitated by adding thereto 35 liters of isopropanol. The precipitate was filtered off and dried to obtain a polycarbonate resin in a white powder form.

The polycarbonate resin obtained above was extruded into pellets at 260° to 280° C. with a 40 mm vented extruder. Using the pellets, the viscosity, flow value, and optical properties of the polycarbonate resin were evaluated. The results obtained are shown in the Table below.

COMPARATIVE EXAMPLE 2

The same procedures as in Comparative Example 1 were repeated except that 8.6 kg of BPZ and 180 g of TBP were used as raw material phenols. The results of property evaluations are shown in the Table below.

EXAMPLE 6

The same procedures as in Example 2 were repeated except that 4.6 kg of 1,1-bis(4-hydroxyphenyl)-1-phenylethane (hereinafter referred to as "BPAP") was used in place of 4.4 kg of BPA, and the amounts of SGOB and TBP were charged to 8.7 kg and 216 g, respectively.

The viscosity, flow value, and optical properties of the polycarbonate resin obtained are shown in the Table below.

EXAMPLE 7

The same procedures as in Example 2 were repeated except that 2.6 kg of bis(4-hydroxyphenyl)ether (hereinafter referred to as "DHPE") was used in place of 4.4 kg of BPA, and the amounts of SGPB and TBP were charged to 10.4 kg and 230 g, respectively.

The viscosity, flow value, and optical properties of the polycarbonate resin obtained were shown in the Table below.

EXAMPLE 8

The same procedures as in Example 2 were repeated except that 4.2 kg of bis(4-hydroxyphenyl)sulfide (hereinafter referred to as "TDP") was used in place of 4.4 kg of BPA.

The results of property evaluations of the polycarbonate resin obtained are shown in the Table below.

EXAMPLE 9

The same procedures as in Example 2 were repeated except that 6.9 kg of 2,2-bis(4-hydroxy-3,5-dibromophenyl)propane (hereinafter referred to as "TBA") was used in place of 4.4 kg of BPA, and the amounts of SGOB and TBP were charged 10.4 kg and 230 g, respectively.

The results of property evaluations of the polycarbonate resin obtained are shown in the Table below.

TABLE

| Example and Comparative Example | Dihydric phenol Phenol of formula (2) kind | Dihydric phenol Phenol of formula (2) amount (mol %) | Compound of formula (1) (mol %) | Properties of polycarbonate resin Viscosity [η] | Properties of polycarbonate resin Q value | Properties of polycarbonate resin Optical properties Refractive index | Properties of polycarbonate resin Optical properties Abbe number |
|---|---|---|---|---|---|---|---|
| Example 1 | — | — | 100 | 0.615 | 140 | 1.529 | 37.0 |
| Example 2 | BPA | 60 | 40 | 0.609 | 29.4 | 1.553 | 36.0 |
| Example 3 | BPA | 90 | 10 | 0.611 | 4.3 | 1.574 | 34.5 |
| Comparative Example 1 | BPA | 100 | — | 0.610 | 2.5 | 1.584 | 33.5 |
| Example 4 | BPZ | 50 | 50 | 0.490 | 18 | 1.549 | 36.7 |
| Example 5 | BPZ | 40 | 60 | 0.485 | 35 | 1.542 | 36.9 |
| Comparative Example 2 | BPZ | 100 | — | 0.480 | 0.8 | 1.586 | 34.0 |
| Example 6 | BPAP | 50 | 50 | 0.500 | 12 | 1.571 | 36.5 |
| Example 7 | DHPE | 40 | 60 | 0.480 | 53 | 1.557 | 36.0 |
| Example 8 | TDP | 60 | 40 | 0.600 | 35 | 1.595 | 34.0 |
| Example 9 | TBA | 40 | 60 | 0.500 | 24 | 1.565 | 35.0 |

[η]: Intrinsic viscosity as measured at 25° C. in a methylene chloride solution.
Q value: Flow value indicating the melt viscosity measured with a Koka flow tester [280° C.; load: 160 kg/cm²; nozzle: 1 mm diameter × 10 mm length].
Refractive index and Abbe number were measured with an Abbe refractometer 2T (manufactured by ATAGO) or a 0.8 mm thick molded sample having a size of 10 mm × 5 mm separately prepared with an injection molding machine.

While the invention has been described in detail and with reference to specific embodiments thereof, it will be apparent to one skilled in the art that various changes and modifications can be made therein without departing from the spirit and scope thereof.

What is claimed is:

1. A polycarbonate resin comprising a repeating structural unit represented by the following structural formula A and derived from a spiro ring-contained dihydric phenol;

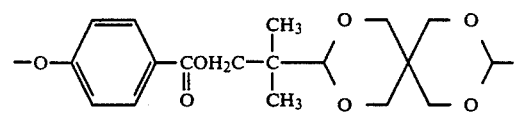

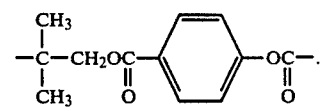

2. A polycarbonate resin comprising a repeating structural unit represented by the following structural formula A and derived from a spiro ring-containing dihydric phenol, and a repeating structural unit represented by the following structural formula B and derived from a dihydric phenol;

Structural Formula A:

Structural Formula B:

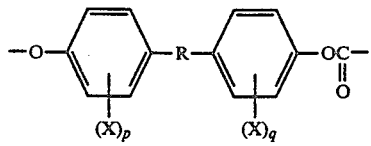

wherein R is a divalent aliphatic group, an alicyclic group, a phenyl-substituted alkylidene group, —O—, —S—, —SO—, —SO$_2$—, or —CO—, X is a halogen atom or a lower alkyl group, and p and q each is 0 or an integer of 1 or 2.

3. A polycarbonate resin as claimed in claim 2, wherein the content of the structural unit represented by the repeating structural formula A is at least 5 mol% per mole of the total dihydric phenols.

4. A polycarbonate resin as claimed in claim 2, wherein R in the structural formula B is a divalent aliphatic group or an alicyclic group.

5. A polycarbonate resin as claimed in claim 2, wherein the repeating structural unit represented by the structural formula B is derived from 2,2-bis(4-hydroxyphenyl) propane or 1,1-bis(4-hydroxyphenyl)cyclohexane.

6. A process for producing a polycarbonate resin, which comprises reacting either a spiro ring-containing dihydric phenol represented by the following formula (1), or the spiro ring-containing dihydric phenyl represented by the formula (1) and a dihydric phenol represented by the following formula (2) with phosgene, a carbonic acid diester, or a polycarbonate precursor in a solvent;

7. A process for producing a polycarbonate resin as claimed in claim 6, wherein said spiro ring-containing dihydric phenol represented by the formula (1) is present in an amount of from 5 to 100 mol% per mole of the total dihydric phenols used.

8. A process as claimed in claim 6, wherein said dihydric phenol represented by the formula (2) is at least one member selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl) propane, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl) propane, 2,2-bis(4-hydroxy-3-bromophenyl)propane, 2,2-bis(4-hydroxy-3-chlorophenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

9. A process as claimed in claim 6, wherein said dihydric phenol represented by the formula (2) is 2,2-bis(4-hydroxyphenyl)propane or 1,1-bis(4-hydroxyphenyl)cyclohexane.

10. A process for producing a polycarbonate resin, which comprises reacting either a spiro ring-containing dihydric phenol represented by the following formula (1), or the spiro ring-containing dihydric phenol represented by the formula (1) and a dihydric phenol represented by the following formula (2), with phosgene in the presence of an inert organic solvent, an aqueous alkali solution, and a molecular weight modifier, and then subjecting the resulting reaction product to interfacial polymerization in the presence of a polymerization catalyst;

Formula (1):

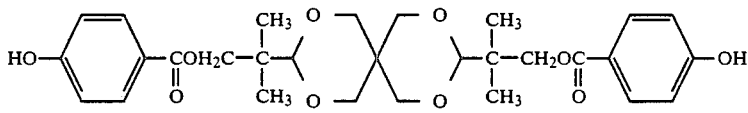

Formula (2):

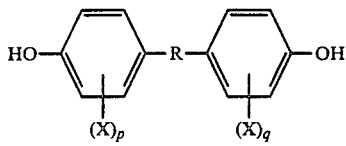

wherein R is a divalent aliphatic group, an alicyclic group, a phenyl-substituted alkylidene group, —O—, —S—, —SO—, —SO$_2$—, or —CO—, X is a halogen atom or a lower alkyl group, and p and q each is 0 or an integer of 1 or 2.

Formula (1):

Formula (2):

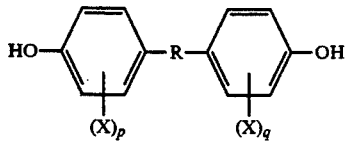

wherein R is a divalent aliphatic group, an alicyclic group, a phenyl-substituted alkylidene group, —O—, —S—, —SO—, —SO₂—, or —CO—, X is a halogen atom or a lower alkyl group, and p and q each is 0 or an integer of 1 or 2.

11. A process for producing a polycarbonate resin, which comprises dissolving, together with a molecular weight modifier, either a spiro ring-containing dihydric phenol represented by the following formula (1), or the spiro ring-containing dihydric phenol represented by the formula (1) and a dihydric phenol represented by the following formula (2), into pyridine or a mixed solvent of pyridine and an inert organic solvent, and then reacting the resulting solution with phosgene; hydroxyl group is further added to the reaction system as a branching agent.

15. A process as claimed in claim 14, wherein said polyfunctional organic compound having a phenolic hydroxyl group is one member selected from the group consisting of polyhydroxy compounds such as phloroglycine, 2,6-dimethyl-2,4,6-tri(4-hydroxyphenyl)heptene-3, 4,6-dimethyl-2,4,6-tri(4-hydroxyphenyl)heptene-2, 1,3,5-tri(2hydroxyphenyl)benzole, 1,1,1-tri(4-hydroxyphenyl)ethane, 2,6-bis(2-hydroxy-5-methylbenzyl)-4-methylphenol, and α,α',α''-tri(4-hydroxyphenyl)-1,3,5-triisopropylbenzene, 3,3-bis(4-hydroxyaryl)oxindol (=isatin bisphenol), 5-chloroisatin, 5,7-dichloroisatin, and 5-bromoisatin.

Formula (1):

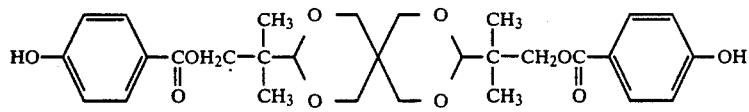

Formula (2):

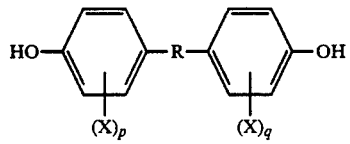

wherein R is a divalent aliphatic group, an alicyclic group, a phenyl-substituted alkylidene group, —O—, —S—, —SO—, —SO₂—, or —CO—, X is a halogen atom or a lower alkyl group, and p and q each is 0 or an integer of 1 or 2.

12. A process as claimed in claim 10 or 11, wherein said molecular weight modifier is at least one member selected from the group consisting of m-methylphenol, p-methylphenol, p-bromophenol, tribromophenols, p-tert-butylphenol, phenol substituted with a long-chain alkyl group, and a long-chain alkyl acid chloride.

13. A process as claimed in claim 10, wherein said polymerization catalyst is a tertiary amine or a quaternary ammonium salt.

14. A process as claimed in claim 10 or 11, wherein a polyfunctional organic compound having a phenolic 16. A process as claimed in claim 10 or 11, wherein a polyfunctional organic compound having a phenolic hydroxyl group is present as a chain-branching agent in an amount of from 0.01 to 3 mol% per mole of the total dihydric phenols respectively represented by the formulas (1) and (2).

17. A process as claimed in claim 10, wherein said polymerization catalyst is at least one member selected from the group consisting of trimethylamine, triethylamine, tributylamine, tripropylamine, trihexylamine, tridecylamine, N,N-dimethylhexylamine, pyridine, quinoline, dimethylaniline, trimethylbenzylammonium chloride, tetramethylammonium chloride, and triethylbenzylammonim chloride.

* * * * *